(12) United States Patent
Kupratis

(10) Patent No.: US 9,909,506 B2
(45) Date of Patent: Mar. 6, 2018

(54) REVERSE CORE GAS TURBINE ENGINE WITH HIGH TEMPERATURE THIRD STREAM

(71) Applicant: United Technologies Corporation, Hartford, CT (US)

(72) Inventor: Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 265 days.

(21) Appl. No.: 14/759,979

(22) PCT Filed: Jan. 28, 2013

(86) PCT No.: PCT/US2013/023365
§ 371 (c)(1),
(2) Date: Jul. 9, 2015

(87) PCT Pub. No.: WO2014/116243
PCT Pub. Date: Jul. 31, 2014

(65) Prior Publication Data
US 2015/0369134 A1    Dec. 24, 2015

(51) Int. Cl.
*F02C 9/18* (2006.01)
*F02K 3/10* (2006.01)
(Continued)

(52) U.S. Cl.
CPC .................. *F02C 9/18* (2013.01); *F01D 1/04* (2013.01); *F02C 3/04* (2013.01); *F02C 3/145* (2013.01);
(Continued)

(58) Field of Classification Search
CPC .... F02C 9/18; F02C 3/145; F02C 7/08; F02C 7/18; F01D 25/14; F01D 25/26;
(Continued)

(56) References Cited

U.S. PATENT DOCUMENTS 3,131,536 A * 5/1964 Stanley ..................... F02K 3/06
60/226.1
3,287,907 A  11/1966 Bill
(Continued)

OTHER PUBLICATIONS

The International Search Report and Written Opinion for PCT Application No. PCT/US2013/023365, dated Sep. 27, 2013.
(Continued)

*Primary Examiner* — Andrew Nguyen
(74) *Attorney, Agent, or Firm* — Carlson, Gaskey & Olds, P.C.

(57) ABSTRACT

A gas turbine engine has a fan rotor for delivering air axially downstream into a core engine duct, which sequentially passes a turbine, a combustor, and a compressor. The core engine duct extends to a turning supply duct configured to turn the core air flow axially upstream so that the core air sequentially passes through the compressor, combustor and turbine, and into an exhaust conduit which turns the core airflow radially outwardly and axially downstream into an exhaust duct. A door is selectively opened to communicate a portion of the core airflow in the core engine duct to an augmentor with the exhaust duct isolated from the augmentor. The door is at a location prior to the core airflow reaching the compressor. A method is also disclosed.

8 Claims, 2 Drawing Sheets

(51) Int. Cl.
*F02K 3/077* (2006.01)
*F01D 1/04* (2006.01)
*F02K 1/78* (2006.01)
*F02K 3/075* (2006.01)
*F02C 3/04* (2006.01)
*F02C 3/14* (2006.01)
*F02C 7/08* (2006.01)
*F02K 3/02* (2006.01)

(52) U.S. Cl.
CPC .............. *F02C 7/08* (2013.01); *F02K 1/78* (2013.01); *F02K 3/025* (2013.01); *F02K 3/075* (2013.01); *F02K 3/077* (2013.01); *F02K 3/10* (2013.01); *F05D 2220/32* (2013.01); *F05D 2250/31* (2013.01)

(58) Field of Classification Search
CPC . F02K 3/077; F02K 3/10; F02K 3/115; F02K 3/075; F02K 3/08; F02K 3/06; F05D 2260/606
See application file for complete search history.

(56) References Cited

U.S. PATENT DOCUMENTS

| | | |
|---|---|---|
| 3,854,286 A | 12/1974 | Klees |
| 4,798,048 A * | 1/1989 | Clements .................. F02K 1/04 60/39.826 |
| 5,154,052 A | 10/1992 | Griffin, III et al. |
| 6,883,302 B2 | 4/2005 | Koshoffer |
| 7,877,980 B2 * | 2/2011 | Johnson .................. F02K 3/075 60/226.1 |
| 2005/0060983 A1* | 3/2005 | Lardellier ................ F02K 1/48 60/226.1 |
| 2006/0086078 A1* | 4/2006 | Paul ........................ F02C 3/045 60/226.1 |
| 2011/0056208 A1* | 3/2011 | Norris ..................... F02C 3/107 60/772 |

OTHER PUBLICATIONS

International Preliminary Report on Patentability for International Application No. PCT/US2013/023365 dated Aug. 6, 2015.

* cited by examiner

REVERSE CORE GAS TURBINE ENGINE WITH HIGH TEMPERATURE THIRD STREAM

BACKGROUND OF THE INVENTION

This application relates to a gas turbine engine having a reverse flow core engine and mixing structure for mixing products of the combustion into the exhaust of the engine Gas turbine engine are known, and will typically include a fan delivering air into a compressor, where the air is compressed. This compressed air passes downstream into a combustion section where it is mixed with fuel and ignited. Products of this combustion pass downstream over turbine rotors, driving them to rotate. The turbine rotors drive the fan and compressor rotors.

Historically, from a front end of the engine to a rear end, the components have been the fan, then the compressor, then the combustor section and then the turbine section. Recently, it has been proposed that the components be arranged such that the air from the fan is delivered into the compressor at a location axially inward of the turbine and the combustor. The air then flows back through the compressor, into the combustor, across the turbine sections, and then radially outwardly to mix with bypass airflow. This arrangement has certain beneficial characteristics compared to the historic arrangement of the gas turbine engine.

SUMMARY OF THE INVENTION

A gas turbine engine has a fan rotor delivering air downstream, relative to free stream air, into a core engine duct. The core engine duct sequentially passes a turbine, a combustor, and a compressor. The core engine duct extends to a turning supply duct configured to turn the core air flow upstream, relative to free stream air, so that the core air sequentially passes through the compressor, combustor and turbine, and into an exhaust conduit which turns the core airflow radially outwardly and downstream into an exhaust duct. A door is selectively opened to communicate a portion of the core airflow in the core engine duct to an augmentor with the exhaust duct isolated from the augmentor. The door is at a location prior to the core airflow reaching the compressor.

In another embodiment according to the previous embodiment, the exhaust duct extends radially outward of the augmentor, and then is allowed to flow toward an exhaust nozzle at a location downstream of the augmentor.

In another embodiment according to any of the previous embodiments, the products of combustion cool structure at the augmentor.

In another embodiment according to any of the previous embodiments, the exhaust duct is positioned radially outwardly of the core engine duct, and heats air in the core engine duct passing to the compressor.

In another embodiment according to any of the previous embodiments, the turbine section drives a shaft to in turn drive the fan rotor.

In another embodiment according to any of the previous embodiments, the exhaust duct is positioned radially outwardly of the core engine duct, and heats air in the core engine duct passing to the compressor.

In another featured embodiment, a gas turbine engine has a fan rotor delivering air downstream, relative to free stream air, into a core engine duct. The core engine duct sequentially passes a turbine, a combustor, and a compressor. The core engine duct extends to a turning supply duct configured to turn the core air flow upstream, relative to free stream air, so that the core air sequentially passes through the compressor, combustor and turbine, and downstream into an exhaust conduit configured to turn the core airflow radially outwardly and into an exhaust duct. A door is selectively opened to communicate a portion of the airflow in the core engine duct to an augmentor with air in the exhaust duct isolated from the augmentor. The door is at a location prior to the core airflow reaching the compressor. The exhaust duct extends radially outward of the augmentor, and then is allowed to flow toward an exhaust nozzle at a location downstream of the augmentor. The products of combustion cool structure at the augmentor. The exhaust duct is positioned radially outwardly of the core engine duct. Heated air in the core engine duct passes to the compressor. The turbine section drives a shaft to in turn drive the fan rotor.

In another featured embodiment, a method of operating a gas turbine engine includes the steps of isolating gas downstream of a turbine rotor that includes products of combustion to be radially outward from an inner airflow that does not include products of combustion, and providing an augmentor associated with a nozzle for the gas turbine engine, and passing the inner airflow to the augmentor, mixing fuel and igniting the inner airflow.

In another embodiment according to the previous embodiment, the gas that includes products of combustion is mixed into the nozzle downstream of the augmentor.

In another embodiment according to any of the previous embodiments, the inner airflow is selectively diverted from an airflow stream heading to a compressor for the gas turbine engine.

These and other features may be best understood from the following specification and drawings, the following which is a brief description.

DETAILED DESCRIPTION

Figure 1:
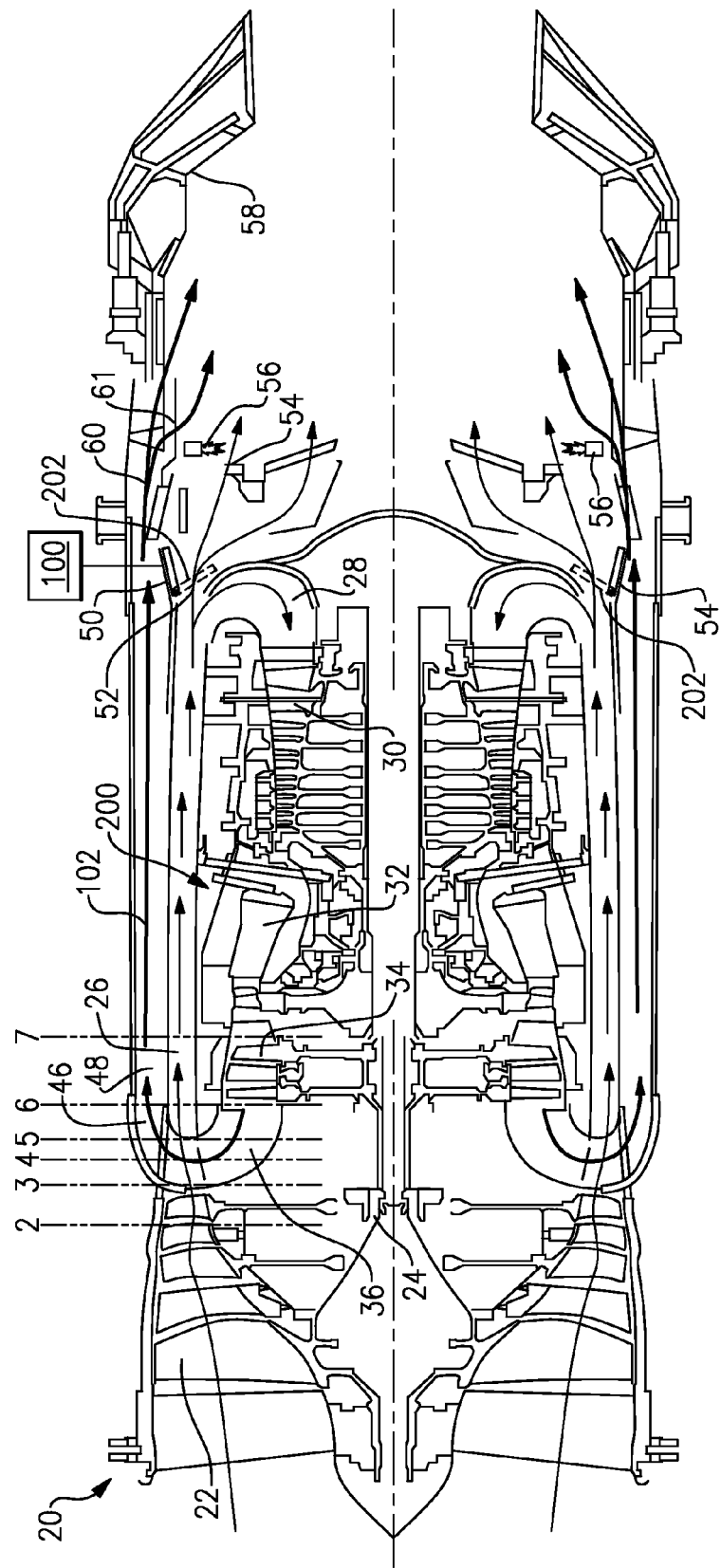
FIG. 1 schematically shows a gas turbine engine.

A gas turbine engine 20 is illustrated in FIG. 1 having a fan rotor 22 driven by a shaft 24 to rotate.

The fan rotor 22 delivers air downstream, relative to free stream air, into a core airflow duct 26. Air from the duct 26 reaches a turning duct 28 where the air is brought radially inward, and upstream relative to free stream air, to communicate with an inlet to a compressor 30. The core airflow duct 26 sequentially passes a turbine rotor 34, a combustor 32 and a compressor 30. Air downstream of the compressor 30 passes into a combustor 32. Products of this combustion pass downstream over a turbine rotor 34, driving the turbine rotor 34 to rotate and also drive shaft 24. The compressor 30, combustor 32, and turbine 34 together form a reverse core engine 24. In typical gas turbine engines, the fan 24 is followed in a downstream position axially by the compressor, then the combustor, then the turbine. However, in the engine 20, the axial location of the compressor 30 and turbine 34 have been switched such that the turbine 34 is closer to the fan 22 than is the compressor 30. The duct 26 sequentially passes the turbine 34 in the combustor 32 and the compressor 30 as it extends into the engine.

Downstream of turbine 34, products of this combustion pass through an exit duct 36, and are delivered radially outwardly through a mixing structure 46, and into a duct 48. This air will be much warmer than the air in the core airflow duct 26, and may serve to heat this air.

A door 50 provided with a control 100 may be selectively opened to allow additional airflow streams 54 to reach an augmentor 56. As known, an augmentor will mix fuel with air, and ignite that air to provide additional propulsion for the engine 20. Augmentors are typically utilized in military style aircraft to provide a relatively fast increase in propulsion. A nozzle 58 is positioned downstream of the augmentor 56. The door 50 can be pivoted to a position shown at 202 at which it blocks flow to the augmentor 56.

In typical gas turbine engines, the exhaust products of combustion are intermixed with the air reaching an augmentor. The exhaust products of combustion have, of course, been ignited, and are relatively oxygen poor. Note the exhaust airflow 102 in duct 48 is isolated from the air reaching augmentor 56, which is radially inward of the exhaust flow 102. By utilizing the core airflow to be delivered and isolating the exhaust airflow from the airflow 60, the airflow 54 at augmentor 56 will be relatively oxygen rich, and greater efficiency will be achieved. Note the door 50 is located at a location upstream of, or prior to, the airflow reaching the compressor 30. The products of combustion pass along the area 60 radially outward of the augmentor 56, they will cool liners associated with the nozzle 58, and augmentor liner 61. Then the products of combustion exit radially inwardly to mix with the airflow 54 downstream of augmentor 56.

Figure 2:
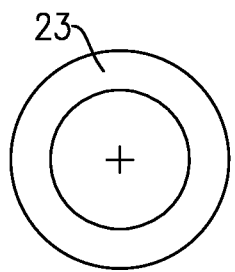
FIG. 2 is a cross-sectional view along the plane identified by line 2 from FIG. 1.

FIG. 2 shows a location at line 2 of FIG. 1. This location would be entirely the core airflow.

Figure 3:
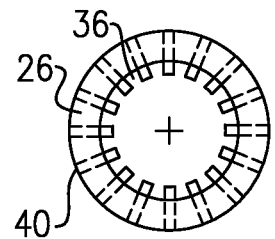
FIG. 3 is a cross-section view along the plane identified by line 3 in FIG. 1.

FIG. 3 shows a duct 36 of the products of combustion downstream of the turbine rotor. At this point, the duct 36 generally extends around 360 degrees about a centerline of the engine. This flow then extends through vanes 40 circumferentially interspersed between portions 26 of the core airflow. The vanes 40 move the products of combustion through limited circumferential extents.

Figure 4:
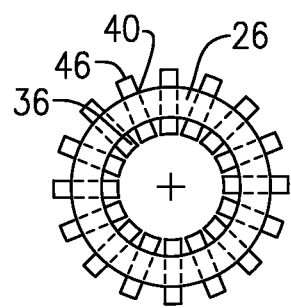
FIG. 4 is a cross-section view along the plane identified by line 3 in FIG. 1.
Figure 5:
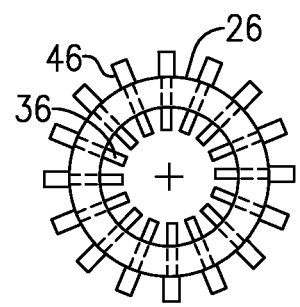
FIG. 5 is a cross-section view along the plane identified by line 3 in FIG. 1.
Figure 6:
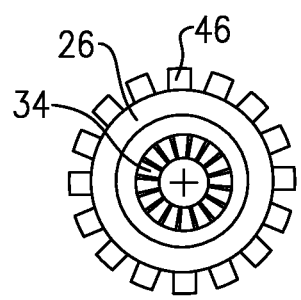
FIG. 6 is a cross-section view along the plane identified by line 3 in FIG. 1.
Figure 7:
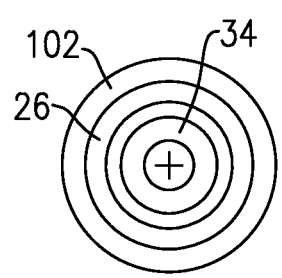
FIG. 7 is a cross-section view along the plane identified by line 3 in FIG. 1.

FIG. 4 shows the vanes 40 having communicated with exit lobes 46 which are radially outward of the core airflow conduit 26. FIG. 5 shows the lobes 46 expanding circumferentially. FIG. 6 shows additional expansion. FIG. 7 shows a location 102 where the exhaust airflow conduit 102 is now the entire 360 degrees about a center axis, and radially outward of the core airflow conduit 26. A central airflow portion 101 can be seen to be intermediate the turbine rotors 34 and combustor 32.

While this application discloses that a flow is over 360 degrees, it should be understood that there may be struts or other limited blockages.

For purposes of this application, the terms "upstream" and "downstream" refer to the direction of the free stream flow of air, where upstream is proximate to an inlet and downstream is distal therefrom.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan rotor for delivering core air flow downstream, relative to a free stream air, into a core engine duct, said core engine duct sequentially passing a turbine, a combustor, and a compressor;
   said core engine duct extending to a turning supply duct configured to turn the core air flow upstream, relative to the free stream air, so that the core air flow sequentially passes through the compressor, combustor and turbine, and into an exhaust conduit which turns the core flow radially outwardly and downstream into an exhaust duct; and
   a door being selectively opened to communicate a portion of the core air flow in said core engine duct to an augmentor with the exhaust duct being isolated from the augmentor, said door being at a location prior to the core air flow reaching the compressor.

2. The engine as set forth in claim 1, wherein said exhaust duct extends radially outward of said augmentor, and said core air flow is then allowed to flow toward an exhaust nozzle at a location downstream of said augmentor.

3. The gas turbine engine as set forth in claim 1, wherein products of combustion cool structure at the augmentor.

4. The gas turbine engine as set forth in claim 3, wherein said exhaust duct is positioned radially outwardly of said core engine duct, and heats air in the core engine duct passing to the compressor.

5. The gas turbine engine as set forth in claim 1, wherein the turbine drives a shaft to in turn drive the fan rotor.

6. The gas turbine engine as set forth in claim 1, wherein said exhaust duct is positioned radially outwardly of said core engine duct, and heats air in the core engine duct passing to the compressor.

7. A gas turbine engine comprising:
   a fan rotor for delivering core air flow downstream, relative to a free stream air, into a core engine duct, said core engine duct sequentially passing a turbine, a combustor, and a compressor;
   said core engine duct extending to a turning supply duct configured to turn the core air flow upstream, relative to the free stream air, so that the core air flow sequentially passes through the compressor, combustor and turbine, and downstream into an exhaust conduit configured to turn the core air flow radially outwardly and into an exhaust duct; and
   a door being selectively opened to communicate a portion of the core air flow in said core engine duct to an augmentor with air in the exhaust duct being isolated from the augmentor, said door being at a location prior to the core air flow reaching the compressor, said exhaust duct extends radially outward of said augmentor, and said core air flow is then allowed to flow toward an exhaust nozzle at a location downstream of said augmentor, wherein products of combustion cooling structure at the augmentor, said exhaust duct being positioned radially outwardly of said core engine duct, and heated air in the core engine duct passing to the compressor, and the turbine driving a shaft to in turn drive the fan rotor.

8. A method of operating a gas turbine engine comprising the steps of:
   isolating gas downstream of a turbine rotor that includes products of combustion to be radially outward from an inner air flow that does not include products of combustion, and providing an augmentor associated with a nozzle for the gas turbine engine, and passing the inner air flow to the augmentor, mixing fuel and igniting the inner air flow;

wherein the gas that includes products of combustion is mixed into the nozzle downstream of the augmentor; and wherein the inner air flow is selectively diverted from an air flow stream heading to a compressor for the gas turbine engine, and said air flow stream heading to said compressor sequentially passing a turbine, a combustor, and the compressor.

* * * * *